(12) United States Patent
Suleiman et al.

(10) Patent No.: US 12,248,107 B2
(45) Date of Patent: Mar. 11, 2025

(54) METHOD FOR IDENTIFYING PARKING SPACES BY MEANS OF ULTRASONIC SENSORS

(71) Applicant: Continental Autonomous Mobility Germany GmbH, Ingolstadt (DE)

(72) Inventors: Wassim Suleiman, Kriftel (DE); Abhishek Kekud, Frankfurt a. Main (DE); Christopher Brown, Seligenstadt (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 0 days.

(21) Appl. No.: 18/255,775

(22) PCT Filed: Nov. 23, 2021

(86) PCT No.: PCT/DE2021/200199
§ 371 (c)(1),
(2) Date: Jun. 2, 2023

(87) PCT Pub. No.: WO2022/117162
PCT Pub. Date: Jun. 9, 2022

(65) Prior Publication Data
US 2024/0103148 A1 Mar. 28, 2024

(30) Foreign Application Priority Data
Dec. 3, 2020 (DE) .................. 10 2020 215 253.5

(51) Int. Cl.
*G08G 1/16* (2006.01)
*G01S 7/539* (2006.01)
*G01S 15/931* (2020.01)

(52) U.S. Cl.
CPC ............ *G01S 7/539* (2013.01); *G01S 15/931* (2013.01); *G01S 2015/933* (2013.01)

(58) Field of Classification Search
CPC .. G01S 7/539; G01S 15/931; G01S 2015/933; G01S 2015/465; G01S 7/5273;
(Continued)

(56) References Cited

U.S. PATENT DOCUMENTS

2010/0134321 A1* 6/2010 Kim ..................... G01S 7/539
340/932.2
2011/0022269 A1* 1/2011 Nakazono ............. G08G 1/165
701/41
(Continued)

FOREIGN PATENT DOCUMENTS

DE 102012004320 A1 9/2013
DE 102013018721 A1 6/2014
(Continued)

OTHER PUBLICATIONS

Notice of Reasons for Refusal drafted Jan. 18, 2024 for the counterpart Japanese Patent Application No. 2023-527731 and machine translation of same.
(Continued)

*Primary Examiner* — Anh V La

(57) ABSTRACT

The invention relates to a method for identifying parking spaces, including emitting an ultrasonic signal and receiving a reflected signal; and providing a grid which of a region having a plurality of cells. Each cell is assigned to a partial region of the region surrounding the vehicle and an occupancy value is assigned to each cell. The reflected signal is assigned to a set of cells of the grid based on a transit time of the ultrasonic signal between emission and reception. The occupancy values of the cells to which the reflected signal is allocated are increased by a specific value. An occupancy information item is determined based on the occupancy values of the cells. The signal emitting/receiving and the reflected signal assigning are repeated multiple times. Park-
(Continued)

ing space identification is performed based on an occupancy status of the cells specified using the occupancy information item determination.

15 Claims, 5 Drawing Sheets

(58) Field of Classification Search
CPC .. G01S 15/46; G01S 15/878; G01S 2015/936; G01S 15/66; G01S 2015/935
USPC ........ 367/93; 340/903, 904, 932.2, 933, 988
See application file for complete search history.

(56) References Cited

U.S. PATENT DOCUMENTS

| | | | |
|---|---|---|---|
| 2011/0057814 A1* | 3/2011 | Park | B60W 30/06 340/932.2 |
| 2015/0344028 A1* | 12/2015 | Gieseke | B60W 30/095 348/148 |
| 2020/0018825 A1 | 1/2020 | Dia | |
| 2020/0225622 A1 | 7/2020 | Buerkle | |
| 2022/0024428 A1* | 1/2022 | Yang | B60W 60/0016 |

FOREIGN PATENT DOCUMENTS

| | | |
|---|---|---|
| DE | 102017101476 B3 | 3/2018 |
| DE | 102020215254 A1 | 6/2022 |
| EP | 1731922 A1 | 12/2006 |
| JP | H07306042 A | 11/1995 |
| JP | 2000513445 A | 10/2000 |
| WO | 2021224001 A1 | 11/2021 |
| WO | 2022117161 A1 | 6/2022 |

OTHER PUBLICATIONS

Decision to Grant a Patent, drafted Apr. 30, 2024 for the counterpart Japanese Patent Application No. 2023-527731 and machine translation of same.
Notice under Rule 71(3) EPC Intention to Grant dated May 15, 2024 for the European Patent Application No. 21 847 674.5 and machine translation of same.
German Search Report dated for May 7, 2021 the counterpart German Patent Application No. 10 2020 215 253.5.
The International Search Report and the Written Opinion of the International Searching Authority mailed on Apr. 13, 2022 for the counterpart PCT Application No. PCT/DE2021/200/199.

* cited by examiner

METHOD FOR IDENTIFYING PARKING SPACES BY MEANS OF ULTRASONIC SENSORS

CROSS REFERENCE TO RELATED APPLICATIONS

The present application is a National Stage Application under 35 U.S.C. § 371 of International Patent Application No. PCT/DE2021/200199 filed on Nov. 23, 2021, and claims priority from German Patent Application No. 10 2020 215 253.5 filed on Dec. 3, 2020, in the German Patent and Trademark Office, the disclosures of which are herein incorporated by reference in their entireties.

FIELD OF INVENTION

The invention relates to a method for identifying parking spaces by means of one or more ultrasonic sensors.

BACKGROUND

The process of capturing environmental information in the region of a vehicle by means of ultrasonic sensors is known, for example, in order to capture the distance from other objects during parking.

The process of performing a parking space identification based on information from multiple ultrasonic sensors by trilateration is likewise known. Not only is it possible to determine the distance of an object, but also the spatial direction in which the object is located, by means of trilateration.

The disadvantage of the known methods for parking space identification is that these are CPU-intensive and the trilateration method is prone to errors due to inaccuracies in the odometry system and signal noise.

SUMMARY

Proceeding herefrom, it is the object of the present disclosure to specify a method for identifying parking spaces by means of one or more ultrasonic sensors, which requires a low computing and memory outlay and is less prone to errors.

The object is addressed by a method having the features of the independent Claim 1. Example embodiments are the subject-matter of the subclaims. A system for identifying parking spaces by means of one or more ultrasonic sensors is the subject-matter of the alternative, independent Claim 10 and a vehicle having such a system is the subject-matter of the alternative, Claim 15.

According to a first aspect, the present disclosure relates to a method for identifying parking spaces by means of at least one ultrasonic sensor which is provided on a vehicle. The method comprises the following steps.

An ultrasonic signal is initially emitted by an ultrasonic sensor of the vehicle. In this case, a single ultrasonic sensor can merely transmit one ultrasonic signal or multiple ultrasonic sensors can, in each case, emit ultrasonic signals simultaneously or one after the other in time.

A reflected signal component of the ultrasonic signal is subsequently received by the ultrasonic sensor. The reflected signal component (also referred to hereinafter as an echo) can either be received by the same ultrasonic sensor which transmitted the ultrasonic signal or by another ultrasonic sensor (so-called cross echo).

In addition, a grid which refers to a region surrounding the vehicle is provided. The grid has a plurality of cells, wherein each cell is assigned to a partial region of the region surrounding the vehicle and an occupancy value is assigned to each cell. The occupancy value of a cell indicates, for example, how often received echoes have already been assigned to said cell. The grid or the cells of the grid are also moved with the respective position of the vehicle, i.e., the grid has a fixed reference to the vehicle position and does not refer to a stationary surrounding region.

The reflected signal component is subsequently assigned to a set of multiple cells of the grid based on the transit time of the ultrasonic signal between the emission and reception of the reflected signal component. Due to the transit time, the distance of the object which causes the reflection can be established by the ultrasonic sensor. Due to the knowledge of the location of the ultrasonic sensor on the vehicle and the odometry data of the vehicle, the received reflected signal component can be assigned to a group of cells. Due to the assignment, the occupancy values of those cells to which the reflected signal component was assigned can in each case be increased by a specific value. The value can be a fixed value or can result from properties of the reflected signal component.

Occupancy information is subsequently determined based on the occupancy values of the cells of the set of cells and, indeed, based on the following steps.

That cell of the set of cells which has the maximum occupancy value is initially determined. In other words, that cell which has the highest occupancy value of the group of cells to which the echo was previously assigned is established.

The maximum occupancy value is subsequently compared with a first threshold.

If the maximum occupancy value exceeds the first threshold, a counter, which is assigned to the cell having the maximum occupancy value, is changed by an incremental value.

The counter is subsequently compared with a second threshold and an occupancy status of the cell is specified depending on the comparison result. In particular, the cell is then characterized as occupied, i.e., a reflecting object is located in the region of the cell if the counter is larger than the second threshold.

The previously described steps of the emission of the ultrasonic signal and reception of the echo, the assignment of the echo to a set of multiple cells of the grid, the increasing of the occupancy values of the set of cells and the determination of occupancy information is repeated several times.

A parking space identification is subsequently performed based on the occupancy status of the cells of the grid. Those surrounding regions having the occupancy status "not occupied" are judged to be "free" for a parking process.

The technical advantage of the method according to the present disclosure is that an identification of free regions in the surroundings of the vehicle is made possible for a parking process, which identification is improved in terms of computing power and memory requirements. The method is not sensitive to the signal noise of the ultrasonic sensor and the false positive rate can be minimized by filtering by means of multiple thresholds.

According to one example embodiment, the set of cells, the occupancy values of which are increased per transmission/reception cycle, is determined by a circular ring segment, the center radius of which depends on the transit time of the ultrasonic signal between the emission and reception of the reflected signal component and wherein the extension of the circular ring segment in the circumferential direction depends on the reception range of the ultrasonic sensor. In other words, the set of cells is exclusively determined by the transit time of the ultrasonic signal between the transmission and reception time and the transmission and/or reception angular range of the ultrasonic sensor. Therefore, the proposed method makes it possible to identify a parking space without carrying out a determination of the azimuth angle which indicates the direction from which the echo is received.

According to one example embodiment, the circular ring segment in the radial direction has a width which is determined by a tolerance value of the ultrasonic sensor and/or a tolerance value of the odometry system which is used to determine the position of the vehicle and/or of the ultrasonic sensor. The width of the circular ring segment is therefore determined by inaccuracies which result due to the sensor technology or the evaluation of the sensor information.

According to one example embodiment, the occupancy values of the cells are in each case increased by a value which depends on the amplitude of the received reflected signal component or the occupancy values of the cells are in each case increased by a fixed value which is not dependent on the received reflected signal component. If the sensor makes amplitude information available, the latter can be used in order to increase the occupancy value of the cells depending on the amplitude. As a result, the strength of the echo can be enlisted to change the occupancy value. In the event that no amplitude information is available, the occupancy value of the cells can be increased by a fixed numerical value, for example 1.

According to one example embodiment, multiple different items of occupancy information are determined in parallel and, indeed, based on information which is established by multiple ultrasonic sensors arranged at different positions on the vehicle. In other words, items of information of different ultrasonic sensors, which are provided at different positions on the vehicle, can be used parallel in time to change occupancy values of cells and to obtain occupancy information resulting therefrom following the change in the occupancy values. As a result, an environmental image can be generated or an existing environmental image can be updated by multiple items of sensor information in parallel.

According to one example embodiment, the ego movement of the vehicle, which occurs in the period of time between the emission and the reception of the ultrasonic signal, is compensated for. As a result, it is possible to compensate for the change in location of the vehicle, which occurs in the period of time between the transmission and reception of the ultrasonic signal compared to a stationary object in the surroundings of the vehicle.

According to one example embodiment, cross echoes between different ultrasonic sensors are also evaluated in order to determine the occupancy information. In other words, a reflected signal component, which is received by another ultrasonic sensor rather than the transmitting sensor, contributes to the determination of the occupancy information and, therefore, to an improved identification of parking spaces.

According to one example embodiment, the grid is a grid which is also moved with the vehicle. The grid can, for example, have a length and/or width which corresponds to 3-times to 6-times the length of the vehicle and, for example, can have an extension of 20 m times 20 m. As a result, the immediate region surrounding the vehicle is comprised by means of the grid, which can be captured by the ultrasonic sensors provided on the vehicle. As a result, storage and computing resources can be saved.

According to one example embodiment, the occupancy values of the cells and/or the counters assigned to the cells and/or the occupancy status of the cells is/are stored in a ring-memory. As a result, the information associated with the cells of the grid can be stored in a memory-optimized manner.

According to a further aspect, the present disclosure relates to a system for identifying parking spaces, comprising at least one ultrasonic sensor and a computing unit which is configured to evaluate the information provided by the ultrasonic sensor. The system is configured to execute the following steps:

a) Emission of an ultrasonic signal by an ultrasonic sensor of the vehicle;

b) Reception of a reflected signal component of the ultrasonic signal by the ultrasonic sensor;

c) Provision of a grid which refers to the region surrounding the vehicle, wherein the grid has a plurality of cells, wherein each cell is assigned to a partial region of the region surrounding the vehicle and an occupancy value is assigned to each cell;

d) Assignment of the reflected signal component to a set of multiple cells of the grid based on the transit time of the ultrasonic signal between the emission and reception of the reflected signal component, wherein the occupancy values of the cells to which the reflected signal component is allocated are in each case increased by a specific value;

e) Determination of an item of occupancy information by means of the computing unit based on the occupancy values of the cells of the set of cells by:
  1. Determining that cell of the set of cells which has the maximum occupancy value;
  2. Comparing the maximum occupancy value with a first threshold;
  3. If the maximum occupancy value exceeds the first threshold, changing a counter, which is assigned to the cell having the maximum occupancy value, by an incremental value; and
  4. Comparing the counter with a second threshold and specifying an occupancy status of the cell depending on the comparison result;

f) Repeating steps a), b), d) and e) multiple times; and g) Performing the parking space identification based on the occupancy status of the cells of the grid.

According to one example embodiment of the system, the computing unit is configured to determine the set of cells, the occupancy values of which are increased per transmission/reception cycle, by a circular ring segment, the center radius of which depends on the transit time of the ultrasonic signal between the emission and reception of the reflected signal component and the extension thereof in the circumferential direction depends on the reception range of the ultrasonic sensor. In other words, the set of cells is exclusively determined by the transit time of the ultrasonic signal between the transmission and reception time and the transmission and/or reception angular range of the ultrasonic sensor. Therefore, a parking space identification is possible thanks to the proposed system, without carrying out a determination of the azimuth angle which indicates the direction from which the echo is received.

According to one example embodiment of the system, the computing unit is configured to determine the set of cells, the occupancy values of which are increased per transmission/reception cycle, by a circular ring segment, the width of which in the radial direction is determined by a tolerance value of the ultrasonic sensor and/or by a tolerance value of the odometry system which is used to determine the position of the vehicle and/or of the ultrasonic sensor. The width of the circular ring segment is therefore determined by inaccuracies which result due to the sensor technology or the evaluation of the sensor information.

According to one example embodiment of the system, the computing unit is configured to determine multiple different items of occupancy information in parallel and, indeed, based on information which is established by multiple ultrasonic sensors arranged at different positions on the vehicle. As a result, an environmental image can be generated or an existing environmental image can be updated based on multiple items of sensor information in parallel.

According to one example embodiment of the system, the computing unit is configured to compensate for the ego movement of the vehicle, which occurs in the period of time between the emission and the reception of the ultrasonic signal. As a result, it is possible to compensate for the change in location of the vehicle which occurs in the period of time between the transmission and reception of the ultrasonic signal compared to a stationary object in the surroundings of the vehicle.

According to yet another aspect, the present disclosure relates to a vehicle having a system for identifying parking spaces according to any one of the previously described example embodiments.

Within the meaning of the invention, the expressions "approximately", "substantially" or "roughly" mean deviations from the exact value in each case by +/−10%, preferably by +/−5% and/or deviations in the form of alterations which are not significant for the function.

Further developments, advantages and possible applications of the invention are also set out in the following description of example embodiments and the figures. All of the features described and/or illustrated are, in principle, the subject-matter of the invention, either individually or in any combination, regardless of how they are summarized in the claims or how they relate back to them. The content of the claims is also made part of the description.

BRIEF DESCRIPTION OF THE DRAWINGS

The invention is explained in more detail below with reference to the figures of example embodiments, wherein.

DETAILED DESCRIPTION

Figure 1:
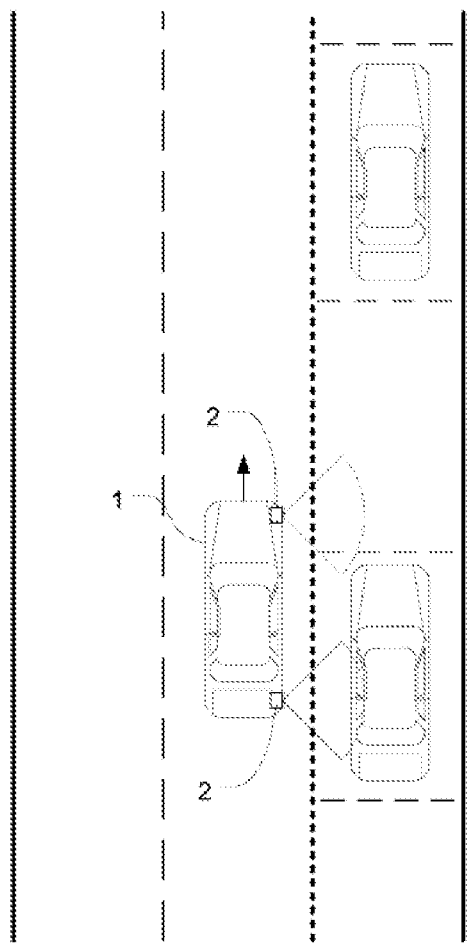
FIG. 1 shows, by way of example and schematically, a vehicle having multiple ultrasonic sensors when driving past a longitudinal parking situation.

FIG. 1 shows, by way of example, a parking situation in which a vehicle 1 drives past multiple longitudinal parking spaces. A parking space located between two vehicles is free. It is understood that the present invention is not only restricted to longitudinal parking situations, but can likewise be applied in transverse parking situations.

The vehicle 1 has multiple ultrasonic sensors 2, by means of which environmental information can be captured. In the example embodiment shown, two ultrasonic sensors 2 are shown. It is understood that more than two ultrasonic sensors can be provided on the vehicle 1. In particular, the ultrasonic sensors 2 can be arranged in such a way that environmental information can be established in front of and behind the vehicle 1 and on both sides of the vehicle 1. In particular, the ultrasonic sensors 2 are configured to emit an ultrasonic signal in a transmission cycle and to receive signal components of the ultrasonic signal, which were reflected by objects in the surroundings of the vehicle 1, in a subsequent reception cycle. The time span between the emission of the ultrasonic signal and the reception of the reflected signal component is a measure of the distance of the object from the ultrasonic sensor 2. As a result, information about objects in the region surrounding the vehicle 1 can be established.

Figure 2:
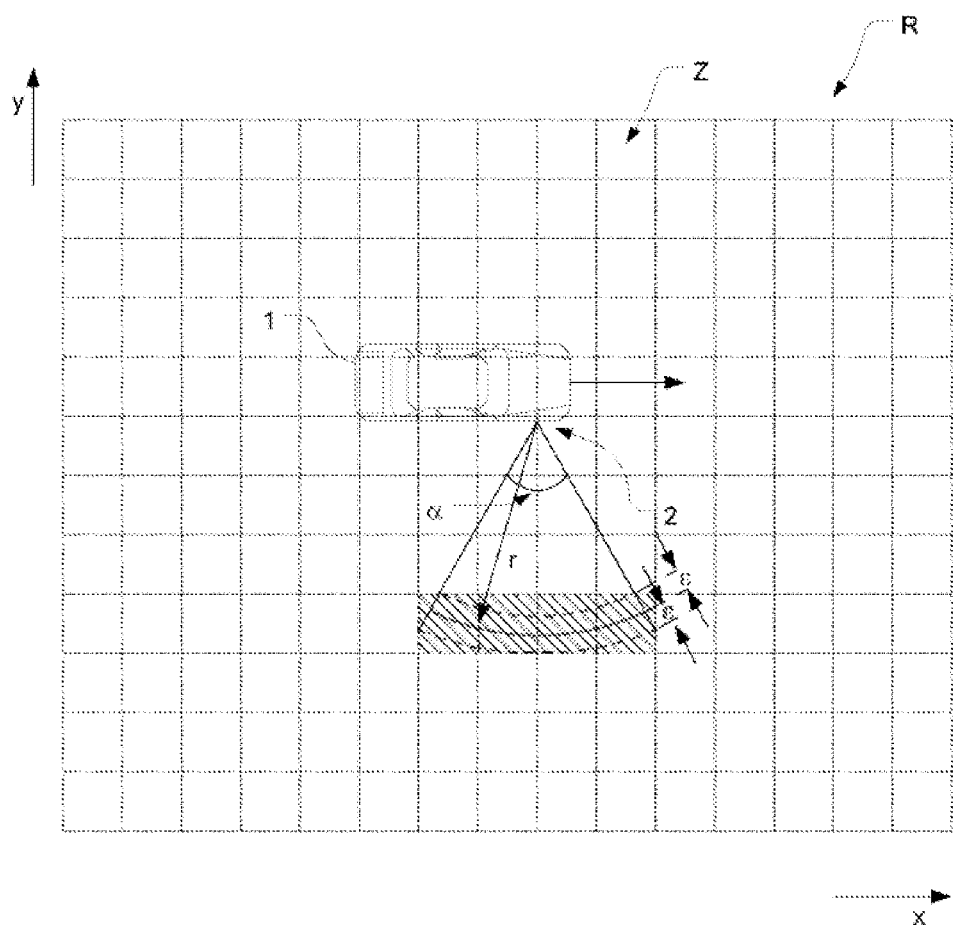
FIG. 2 shows, by way of example, the representation of a surrounding region of a vehicle subdivided by a grid and a schematic representation of a detection of an object by means of an ultrasonic sensor in the surrounding region.

FIG. 2 shows the region surrounding 3 the vehicle 1, which is divided into partial regions of the surroundings by means of a grid R. The surrounding region can have a firmly predefined extent in the x and y direction, for example 20 m×20 m. The grid R has a plurality of cells Z, wherein the cells Z directly join one another in a checkered manner, so that each cell Z relates to a determined partial region of the surroundings. The grid R having the cells Z serves to map environmental information captured by one or more ultrasonic sensors 2 over multiple transmission/reception cycles in a discrete localized manner and to therefore obtain a discretized environmental image.

In FIG. 2, a detection of the ultrasonic sensor 2 is indicated by the solid circular arc section. The center radius r can be established from the transit time of the ultrasonic signal between the time the reflected component is output and received. The angle α along which the circular arc extends is specified by the capturing range of the ultrasonic sensor 2.

Both the ultrasonic sensor 2 and the odometry unit of the vehicle 1, by means of which the local position of the vehicle 1 and therefore of the ultrasonic sensor 2 can be determined, have a certain tolerance, so that the location of the detected object relative to the vehicle 1 is subject to a certain degree of inaccuracy. This inaccuracy is taken into account by the tolerance value ε. If an object is captured at a distance r from the ultrasonic sensor 2, the object can lie, due to the aforementioned inaccuracies, in the region r±ε, i.e., in a circular arc-shaped strip having the width 2ε. Said circular arc-shaped strip is characterized in FIG. 2 by the two dashed circular arcs.

For the most part, an individual ultrasonic sensor 2 does not make it possible to determine the azimuth angle of the reflected signal component, so that a received reflection can come from any direction in the reception range of the ultrasonic sensor 2. Consequently, a reflection can originate from an object which is located in the circular arc-shaped strip having the width 2ε. In the example shown in FIG. 2, the reflection can therefore originate from objects which are located in the hatched cells Z.

Figure 3:
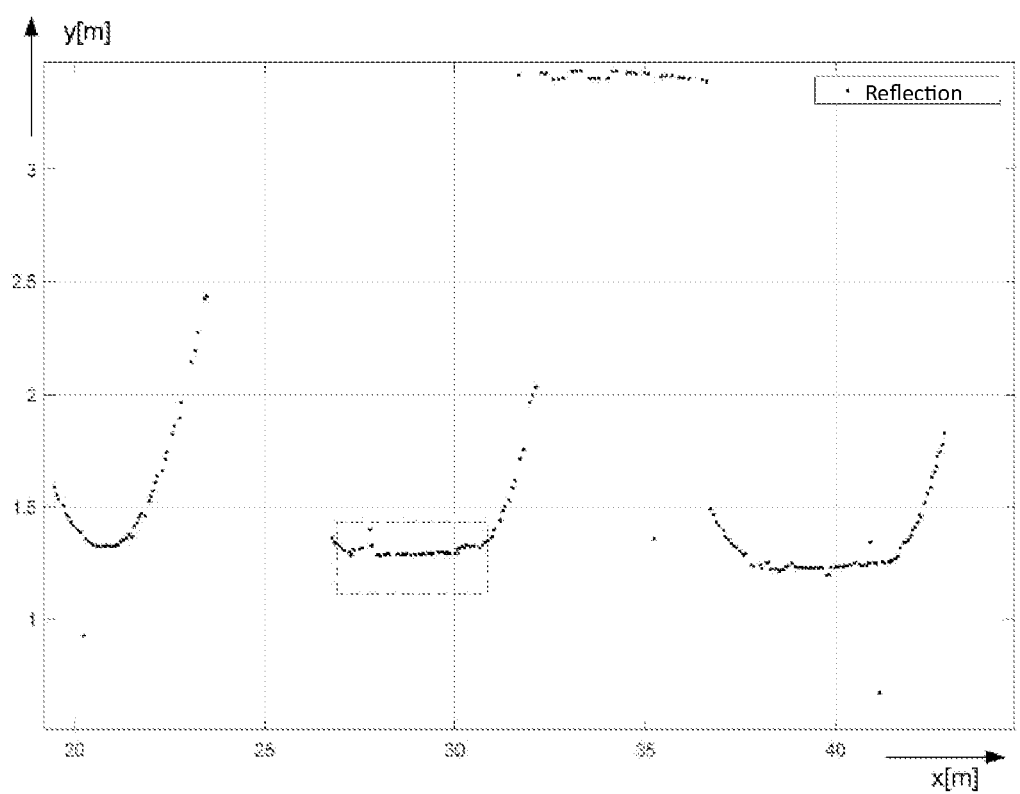
FIG. 3 shows, by way of example, a representation of a plurality of received ultrasonic echoes in the region surrounding a vehicle, wherein the echoes are plotted, in terms of location, in a two-dimensional map.

FIG. 3 shows a diagram in which the local location of reflections in the region surrounding the vehicle 1 are plotted by means of points. It can be seen that false positive detections occur due to signal noise and other detrimental influences, which prevent or complicate the identification of parking spaces. A detection algorithm is proposed below which, on the one hand, reduces the false positive rate of detections, on the other hand requires a small amount of computing hardware (processor power and/or memory requirements).

Figure 4:
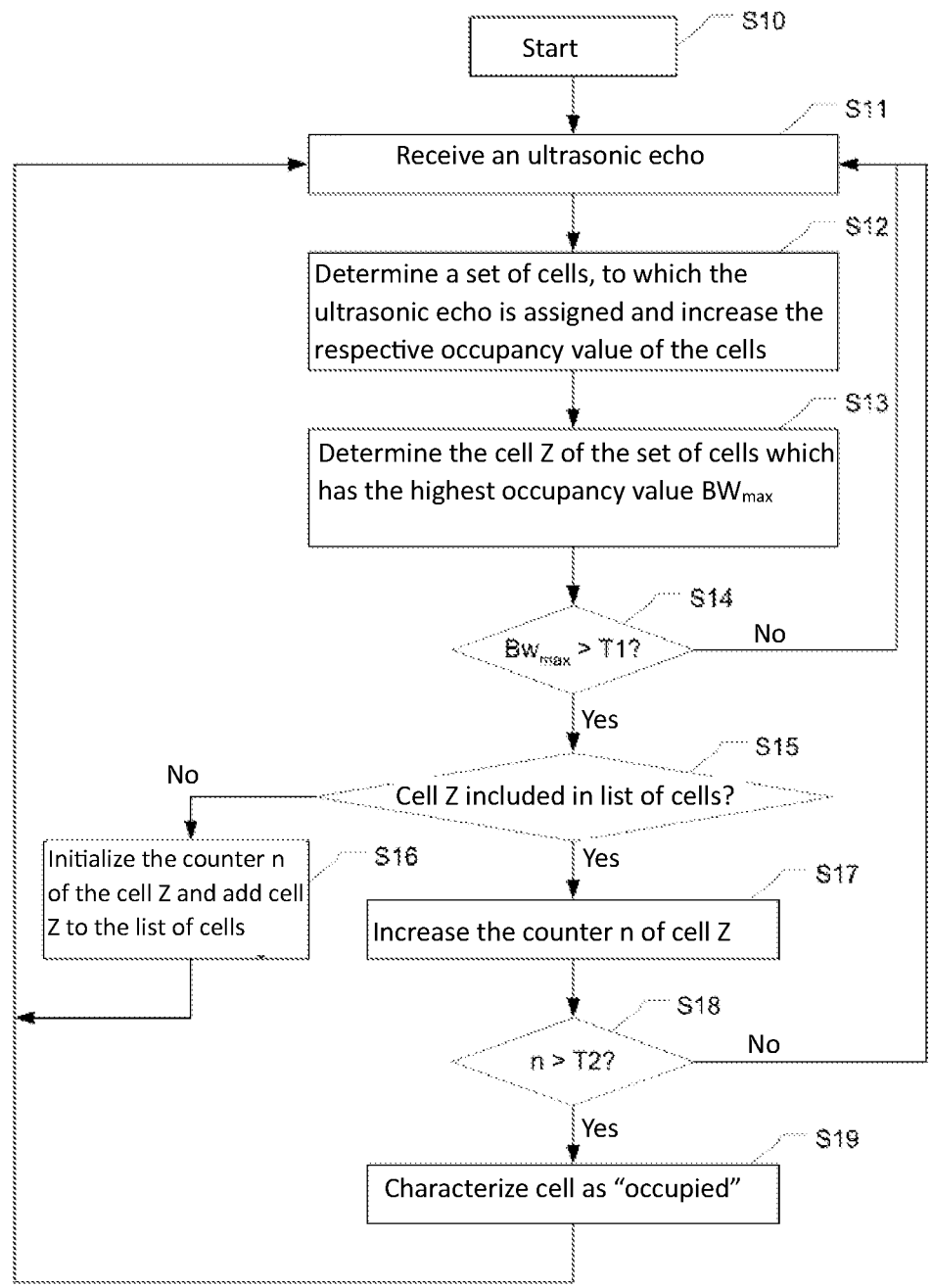
FIG. 4 shows, by way of example, a flowchart of a method for establishing occupancy information assigned to the cells of the grid.

FIG. 4 shows a flowchart of a detection algorithm according to one example embodiment of the present disclosure.

Following the start of the algorithm (S10), an empty list of cells is first initialized and a first threshold T1 and a second threshold T2 are specified. Thereafter, a transmission/reception cycle is performed, during which one or more ultrasonic sensors 2 emit an ultrasonic signal and receive a reflected signal component (S11), if an object at which a reflection occurs is present in the capturing range of the ultrasonic sensor 2.

Following the reception of the reflected signal component, a set of cells to which the ultrasonic echo is assigned is determined. This is effected, for example, as described above, taking into account the transit time of the ultrasonic signal between the time the ultrasonic signal is output and the reflected component is received, the tolerance value ε and the angular range in which the ultrasonic sensor 2 can receive ultrasonic signals.

An occupancy value BW is assigned in each case to the cells Z of the grid R. If it is ascertained in step S12 that a received, reflected signal component is to be assigned to a cell (in the example of FIG. 2, these are the four hatched cells Z), the occupancy value BW of the cell is in each case increased by a certain value. The value can be determined, for example, depending on the signal strength of the received, reflected signal component or can be a fixed incremental value, for example 1.

That cell Z of the set of cells (in the example of FIG. 2, these are the four hatched cells Z) which has the highest occupancy value $BW_{max}$ is subsequently determined. Regarding this, it should be noted that following a plurality of reception cycles, occupancy values BW of differing levels are assigned to the cells Z of the grid, since the cells Z are assigned to a set of cells in which a detection falls with differing levels of frequency.

Following the determination of the cell Z having the maximum occupancy value $BW_{max}$, it is checked whether the maximum occupancy value $BW_{max}$ is larger than the threshold T1 (S14). If this is not the case, the algorithm is terminated and performed again when a new, reflected ultrasonic signal (also referred to as an ultrasonic echo) is received (i.e., a jump is made back to step S11). If, however, the maximum occupancy value $BW_{max}$ is larger than the threshold T1, it is verified whether the cell Z, to which the maximum occupancy value $BW_{max}$ is assigned, is already included in the list of cells (S15). If this is not the case, the cell Z is added to the list of cells and a counter n, to which said cell is assigned, is initialized with a starting value (S16). After the cell Z is added to the list of cells and the counter is initialized, the algorithm is terminated and performed again when a new, reflected ultrasonic signal (also referred to as an ultrasonic echo) is received (i.e., a jump is made back to step S11).

However, if it is ascertained in step S15 that the cell Z, to which the maximum occupancy value $BW_{max}$ is assigned, is already included in the list of cells, the counter n, to which the cell Z is assigned, is increased by an incremental value which can in particular be 1 (S17).

Following the incrementing of the counter n, it is checked whether the incremented counter n is larger than the second threshold T2 (S18). If this is not the case, the algorithm is terminated and performed again when a new, reflected ultrasonic signal (also referred to as an ultrasonic echo) is received (i.e., a jump is made back to step S11).

If, however, the condition checked in step S18 is met, the cell Z to which the counter n is assigned is marked as "occupied". After that, the algorithm is terminated and performed again when a new, reflected ultrasonic signal (also referred to as an ultrasonic echo) is received (i.e., a jump is made back to step S11).

The previously described algorithm therefore utilizes a two-stage detection approach in order to establish the occupancy status in the vehicle environment. It is checked in a two-stage method whether a detection has been identified multiple times in the region of a cell in order to lower the false positive detection rate.

Based on the cells Z characterized as occupied, it can be established which partial regions of the surroundings of the vehicle 1 are occupied. In other words, a grid-like image can be produced by means of the occupancy information of the cells, wherein the non-occupied items of information can be used, for example, for a parking space identification. It is checked, for example, whether the distance between two cells characterized as occupied is larger than the length of the vehicle 1, or whether the width is larger than the width of the vehicle 1. It can therefore be verified whether a parking space, which is suitable in terms of length and width for the vehicle 1, was identified.

The previously described algorithm is preferably performed iteratively in each case following the reception of a reflected ultrasonic signal from an ultrasonic sensor 2. Reception signals of multiple ultrasonic sensors 2 can be used to establish the occupancy status of the cells Z of the grid R. It is equally possible that cross echoes between multiple ultrasonic sensors 2 are enlisted to establish the occupancy status of the cells Z of the grid R. This means that a reflected signal component of an ultrasonic signal, which is also received by another ultrasonic sensor as the transmitting ultrasonic sensor, is enlisted for establishing the occupancy status.

Figure 5:
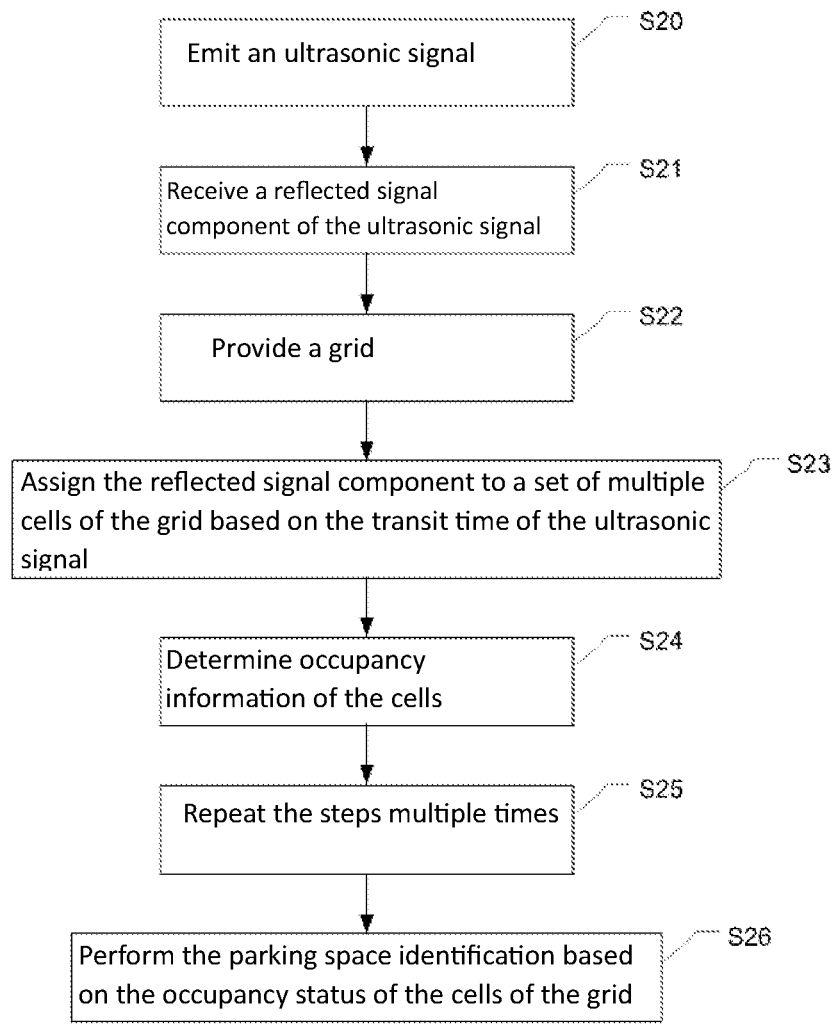
FIG. 5 shows, by way of example, a flowchart which illustrates the steps of a method for identifying parking spaces in the region surrounding the vehicle.

FIG. 5 shows a schematic diagram of the steps of a method according to the present disclosure for identifying parking spaces by means of at least one ultrasonic sensor 2 of a vehicle 1.

An ultrasonic signal is initially emitted by an ultrasonic sensor 2 of the vehicle 1 (S20).

A reflected signal component of the ultrasonic signal is subsequently received by the ultrasonic sensor 2 (S21). The receiving ultrasonic sensor can be the same as or different to the transmitting ultrasonic sensor 2.

In addition, a grid R is provided, which refers to the region surrounding the vehicle 1 (S22). The grid R has a plurality of cells Z, wherein each cell Z is assigned to a partial region of the region surrounding the vehicle 1 and an occupancy value BW is assigned to each cell Z.

The reflected signal component is assigned to a set of multiple cells Z of the grid R based on the transit time of the ultrasonic signal between the emission and reception of the reflected signal component (S23). The occupancy values BW of the cells Z, to which the reflected signal component is allocated, are increased in each case by a specific value.

An item of occupancy information is subsequently determined by means of the computing unit based on the occupancy values BW of the cells Z of the set of cells (S24) and, indeed, by the following steps:

1. Determining that cell Z of the set of cells which has the maximum occupancy value $BW_{max}$;
2. Comparing the maximum occupancy value $BW_{max}$ with a first threshold T1;

3. If the maximum occupancy value $BW_{max}$ exceeds the first threshold T1, changing a counter n, which is assigned to the cell Z having the maximum occupancy value $BW_{max}$, by an incremental value; and 4. Comparing the counter n with a second threshold T2 and specifying an occupancy status of the cell Z depending on the comparison result.

The steps S20 to S24 are subsequently repeated several times, i.e., ultrasonic signals are emitted/received multiple times and a determination of occupancy information (S25) based thereon. This is preferably effected at different positions of the vehicle 1, wherein the movement of the vehicle 1 is compensated for by the odometry data thereof during the determination of the occupancy information.

A parking space identification based on the occupancy status of the cells Z of the grid R is finally performed (S26).

The invention has been described above using example embodiments. It is understood that numerous alterations as well as modifications are possible, without departing from the scope of protection defined by the claims.

LIST OF REFERENCE NUMERALS

1 Vehicle
2 Ultrasonic sensor
BW Occupancy value
$BW_{max}$ Maximum occupancy value
e Tolerance value
n Counter
r Center radius
R Grid
T1 First threshold
T2 Second threshold
Z Cell

The invention claimed is:

1. A method for identifying parking spaces by at least one ultrasonic sensor of a vehicle, comprising:
   a) emitting an ultrasonic signal by an ultrasonic sensor of a vehicle;
   b) receiving a reflected signal component of the ultrasonic signal by the ultrasonic sensor;
   c) providing a grid which refers to a region surrounding the vehicle, wherein the grid has a plurality of cells, wherein each cell is assigned to a partial region of the region surrounding the vehicle and an occupancy value is assigned to each cell;
   d) Assigning the reflected signal component to a set of multiple cells of the grid based on a transit time of the ultrasonic signal between the emission of the ultrasonic signal and the reception of the reflected signal component, wherein the occupancy values of the cells to which the reflected signal component is allocated are in each case increased by a specific value;
   e) determining of an item of occupancy information based on the occupancy values of the cells of the set of cells by:
      1. determining that a cell of the set of cells which has a maximum occupancy value;
      2. comparing the maximum occupancy value with a first threshold;
      3. If the maximum occupancy value exceeds the first threshold, changing a counter, which is assigned to the cell having the maximum occupancy value, by an incremental value; and
      4. comparing the counter with a second threshold and specifying an occupancy status of the cell depending on the comparison-result;
   f) repeating a), b), d) and e) multiple times; and
   g) performing parking space identification based on the occupancy status of the cells of the grid.

2. The method according to claim 1, wherein the set of cells, the occupancy values which are increased per emission/reception cycle, is determined by a circular ring segment, a center radius of which depends on the transit time of the ultrasonic signal between the emission of the ultrasonic signal and the reception of the reflected signal component, and wherein an extension of the circular ring segment in a circumferential direction depends on a reception range of the ultrasonic sensor.

3. The method according to claim 2, wherein the circular ring segment in a radial direction has a width which is determined by at least one of a tolerance value of the ultrasonic sensor or a tolerance value of an odometry system of the vehicle which is used to determine at least one of a position of the vehicle or a position of the ultrasonic sensor.

4. The method according to claim 1, wherein the occupancy values of the cells are in each case increased by a value which depends on an amplitude of the received reflected signal component, or the occupancy values of the cells are in each case increased by a fixed value which is not dependent on the received reflected signal component.

5. The method according to claim 1, further comprising determining multiple different items of occupancy information in parallel based on information which is established by multiple ultrasonic sensors arranged at different positions on the vehicle.

6. The method according to claim 1, further comprising compensating for movement of the vehicle which occurs in a period of time between the emission of the ultrasonic signal and the reception of the reflected signal component.

7. The method according to claim 1, further comprising evaluating cross echoes between different ultrasonic sensors in order to determine the item of the occupancy information.

8. The method according to claim 1, wherein the grid is a grid which is moved with the vehicle.

9. The method according to claim 1, further comprising storing at least one of the occupancy values of the cells, the counters assigned to the cells, and/or the occupancy status of the cells in a ring-memory.

10. A system for identifying parking spaces, comprising at least one ultrasonic sensor and a computing hardware unit which is configured to evaluate the information provided by the ultrasonic sensor, wherein the system is configured to execute the following:
   a) emitting an ultrasonic signal by an ultrasonic sensor of a vehicle;
   b) receiving a reflected signal component of the ultrasonic signal by the ultrasonic sensor;
   c) providing a grid which refers to a region surrounding the vehicle, wherein the grid has a plurality of cells, wherein each cell is assigned to a partial region of the region surrounding the vehicle and an occupancy value is assigned to each cell;
   d) assigning the reflected signal component to a set of multiple cells of the grid based on a transit time of the ultrasonic signal between the emission of the ultrasonic signal and the reception of the reflected signal component, wherein the occupancy values of the cells to which the reflected signal component is allocated are in each case increased by a specific value;
   e) determining an item of occupancy information by the computing hardware unit based on the occupancy values of the cells of the set of cells by:

1. determining that cell of the set of cells which has a maximum occupancy value;
2. comparing the maximum occupancy value with a first threshold;
3. if the maximum occupancy value exceeds the first threshold, changing a counter, which is assigned to the cell having the maximum occupancy value, by an incremental value; and
4. comparing the counter with a second threshold and specifying an occupancy status of the cell depending on the comparison result;

f) repeating a), b), d) and e) multiple times; and g) performing parking space identification based on the occupancy status of the cells of the grid.

11. The system according to claim 10, wherein the computing hardware unit is configured to determine the set of cells, the occupancy values of which are increased per emission/reception cycle, by a circular ring segment, a center radius of which depends on the transit time of the ultrasonic signal between the emission of the ultrasonic signal and the reception of the reflected signal component and an extension thereof in a circumferential direction depends on a reception range of the ultrasonic sensor.

12. The system according to claim 10, wherein the computing hardware unit is configured to determine the set of cells, the occupancy values of which are increased per emission/reception cycle by a circular ring segment, a width of which in a radial direction is determined by at least one of a tolerance value of the ultrasonic sensor or a tolerance value of an odometry system of the vehicle which is used to determine at least one of a position of the vehicle or a position of the ultrasonic sensor.

13. The system according to claim 10, wherein the computing hardware unit is configured to determine multiple different items of occupancy information in parallel based on information which is established by multiple ultrasonic sensors arranged at different positions on the vehicle.

14. The system according to claim 10, wherein the computing hardware unit is configured to compensate for movement of the vehicle, which occurs in a period of time between the emission of the ultrasonic signal and the reception of the reflected signal component.

15. A vehicle comprising a system according to claim 10.

* * * * *